United States Patent
Tucker

[15] 3,698,401
[45] Oct. 17, 1972

[54] TOBACCO ASH RECEIVER

[72] Inventor: Robert V. Tucker, 1954 Axtell Road, Troy, Mich. 48084

[22] Filed: March 1, 1971

[21] Appl. No.: 119,567

[52] U.S. Cl. .................................131/235 R, 131/241
[51] Int. Cl. ..............................................A24f 19/14
[58] Field of Search......131/231, 235 R, 235 ST, 236, 131/237, 241, 256

[56] References Cited

UNITED STATES PATENTS

| | | | |
|---|---|---|---|
| 1,772,176 | 8/1930 | Benjamin | 131/235 R |
| D172,130 | 5/1954 | Coulter | 131/241 UX |
| D162,060 | 2/1951 | Nelson | 131/241 UX |
| 1,485,223 | 2/1924 | Greene | 131/241 UX |
| 2,931,367 | 4/1960 | Glenny | 131/256 |

FOREIGN PATENTS OR APPLICATIONS

| | | | |
|---|---|---|---|
| 950,132 | 2/1964 | Great Britain | 131/241 |

Primary Examiner—Joseph S. Reich

[57] ABSTRACT

A tobacco ash receiver that is placed on top of an automobile instrument panel by means of a weighted T-shaped support member arranged to follow the contour of the dash panel. The lower end portion of the T-shaped member extends perpendicularly therefrom and terminates in an extinguisher. The upper portion of a wall of the receiver and said lower end portion are apertured to receive a rivet therethrough so that the receiver may be held in position approximately at eye level thus allowing his eyes on the road ahead. The receiver in this position is more readily accessible than the standard ash trays that come with the automobiles and especially the automobiles with no vent windows. It may be positioned center, left or right for maximum convenience.

1 Claim, 5 Drawing Figures

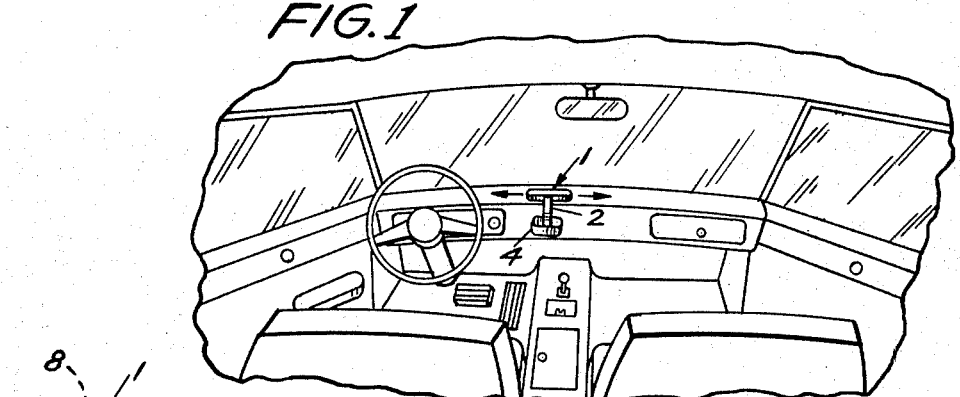
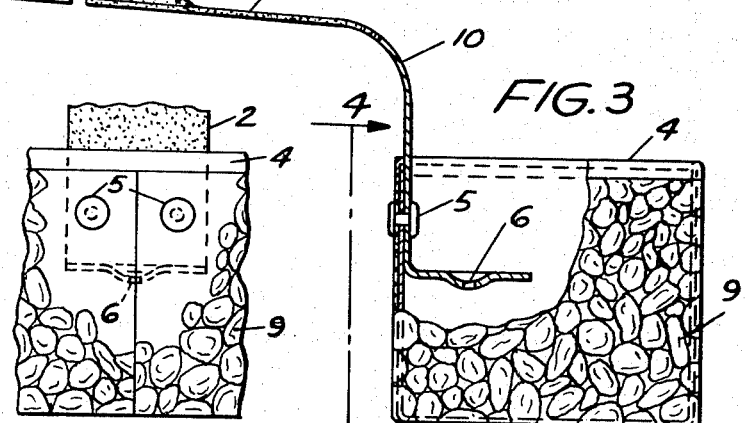
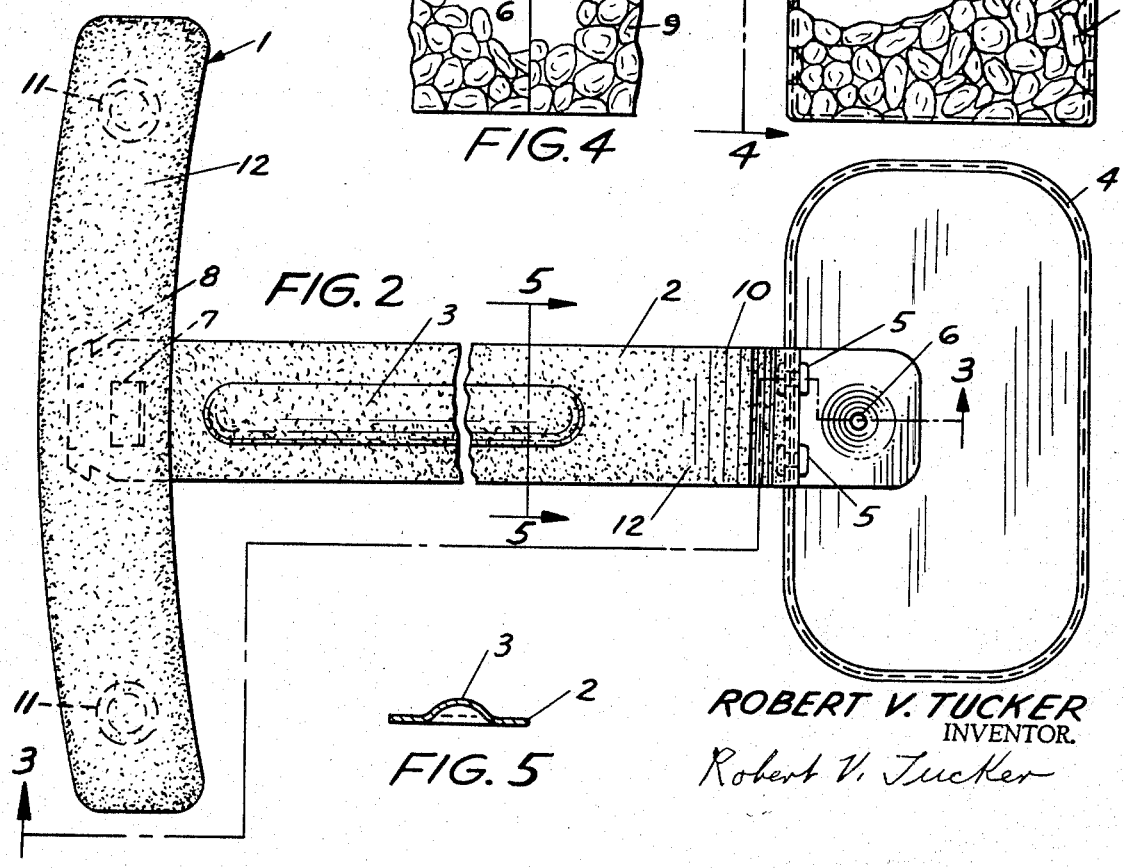
ROBERT V. TUCKER
INVENTOR.
Robert V. Tucker

TOBACCO ASH RECEIVER

BACKGROUND OF THE INVENTION

1. The Field of the Invention

In making auto trips, it was noted that while driving with the seat belt and the shoulder strap in place it is extremely difficult to reach the ash tray supplied by the car manufacturers.

2. Description of the Prior Art

Automobiles' ash trays are hard to see as they are usually low down on the instrument panel and a driver must take his eyes off the road to extinguish a cigarette or cigar. This is a very dangerous condition and may account for many highway accidents. It is even more dangerous when traveling at the higher speeds or in a rain or snow storm. Therefore, the inventor believes an ash receiver more near a driver's eye level, and able to be varied laterally to the user's convenience, is a vast improvement over the ash trays supplied by automobile manufacturers. This receiver is more necessary in the newer cars with no vent windows where ashes may blow back toward the driver.

SUMMARY OF THE INVENTION

This invention, when placed in position on top of an automobile instrument panel will allow the driver and passenger to more readily dispose of ashes generated by lighted cigarettes and cigars. The ash receiver, when hung over the panel toward the smokers, will be in a proper position to receive these ashes and butts. These people will be able to use the receiver, or receivers, without reaching too far and will not have to take their eyes off the road to use it. This feature should result in fewer automobile accidents on the highways of the world.

A brief detailed description of the invention which is marked in the drawing as:

FIG. 1 - is a perspective view of the tobacco ash receiver showing movability in either direction.

FIG. 2 - is the plan view of the ash receiver.

FIG. 3 - is a sectional and elevational view of the ash receiver substantially along the line 3—3 in FIG. 2.

FIG. 4 is a partial elevational view taken along the line 4—4 in FIG. 3.

FIG. 5 - is a sectional view taken along the line 5—5 in FIG. 2.

The numeral 4 indicates a metallic cigarette and ash receiver. The numeral 2 indicates a metal strap attached to the receiver and also to a weight 1 which with the suction cups 11, holds the entire assembly in position on the instrument panel. The ash receiver 4 is attached to the strap 2 by means of rivets 5 and the strap is provided with a hole 6 for extinguishing cigars or cigarettes as shown.

Counter weight 1 is made of cast leas or iron. Strap 2 is made of tempered cold rolled steel and is affixed to counterweight 1 by punched slot 7 with raised shank and cut-out slots 8 as shown in FIG. 2 and FIG. 3. Counterweight 1 with the end of strap 2 with slot 7 and slots 8 will be molded together at the same time. Bending of strap 2 is at 10 to fit contour of instrument panel. Ash receiver 4 is covered by paint or other material 9 glued in place or a combination thereof. Suction cups 11 are affixed by glue to counterweight 1 to prevent sliding along top of instrument panel. Plastic covering or flocking 12 on counterweight 1 and strap 2 is for appearance and to shield metal from excessive heat and cold to the touch.

This invention, being an improvement in automobile ash receivers, is a definite safety advantage by being placed in a position near to eye level. It is convenient in use. It is portable. It can be used by either the driver or the passenger. It can be readily emptied.

I claim this invention is a new and novel improvement in tobacco ash receivers. With this invention the inventor claims that:

1. An ash receptacle adapted to be used in conjunction with the dash panel of an automobile comprising a generally T-shaped supporting member comprising a leg and a cross member, the cross member being weighted and having suction cups at each end thereof adapted to be positioned on an upper horizontal portion of the dash panel, the leg having an arcuate median portion adapted to lie adjacent to the vertical portion of said panel and having a lower end portion extending generally horizontally and having means for extinguishing a cigarette therein, said leg having an aperture adjacent to and above said end portion, and a receiver for ashes and smokers' debris comprising an open topped member having sides and a bottom, one of said sides having an aperture therethrough below and adjacent to the upper end thereof adapted to be aligned with the aperture in said leg, and fastening means extending through said apertures whereby the ash receiver is supported by the lower end portion of said leg below the upper portion of the dash panel with the extinguisher extending horizontally therewithin.

* * * * *